(12) United States Patent
Srinivasan et al.

(10) Patent No.: US 11,163,475 B2
(45) Date of Patent: Nov. 2, 2021

(54) BLOCK INPUT/OUTPUT (I/O) ACCESSES IN THE PRESENCE OF A STORAGE CLASS MEMORY

(71) Applicant: International Business Machines Corporation, Armonk, NY (US)

(72) Inventors: Vaidyanathan Srinivasan, Bangalore (IN); Mehulkumar Patel, Bangalore (IN); Saravanan Sethuraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/431,223

(22) Filed: Jun. 4, 2019

(65) Prior Publication Data

US 2020/0387319 A1 Dec. 10, 2020

(51) Int. Cl.
*G06F 3/06* (2006.01)
*G06F 13/16* (2006.01)

(52) U.S. Cl.
CPC .......... *G06F 3/0647* (2013.01); *G06F 3/0604* (2013.01); *G06F 3/065* (2013.01); *G06F 3/068* (2013.01); *G06F 3/0659* (2013.01); *G06F 13/1668* (2013.01)

(58) Field of Classification Search
CPC .... G06F 3/0647; G06F 3/065; G06F 13/1668; G06F 3/0604; G06F 3/068; G06F 3/0659
See application file for complete search history.

(56) References Cited

U.S. PATENT DOCUMENTS

| 8,296,496 | B2 | 10/2012 | Mogul et al. |
| 8,332,572 | B2 | 12/2012 | Tzeng |
| 9,495,301 | B2 * | 11/2016 | Gross ................. G06F 11/0793 |
| 9,836,409 | B2 | 12/2017 | Karamcheti et al. |
| 9,928,186 | B2 | 3/2018 | Lee et al. |
| 2009/0198872 | A1 | 8/2009 | Tzeng |
| 2011/0066790 | A1 | 3/2011 | Mogul et al. |
| 2012/0317385 | A1 * | 12/2012 | Driever ................. G06F 3/0647 711/165 |
| 2014/0095769 | A1 * | 4/2014 | Borkenhagen .......... G11C 5/04 711/103 |

(Continued)

OTHER PUBLICATIONS

Huang, Henry F., and Tao Jiang. "Design and implementation of flash based nvdimm." 2014 IEEE Non-Volatile Memory Systems and Applications Symposium (NVMSA). IEEE, 2014. (Year: 2014).*

(Continued)

*Primary Examiner* — Francisco A Grullon
(74) *Attorney, Agent, or Firm* — Patterson + Sheridan, LLP (57) ABSTRACT

Method and apparatus for managing memory includes collocating electronic persistent memory along with a primary memory on a memory module. The electronic persistent memory and the primary memory may communicate via a module local bus comprising a plurality of memory channels. A data migration protocol may be used over a memory channel of the plurality of memory channels to copy data from the electronic persistent memory to the primary memory, and the data may be accessed from the primary memory. The combination of electronic persistent memory and primary memory (e.g. DRAM) in a single memory module with module local bus having a device controller running firmware is one implementation of storage class memory (SCM).

18 Claims, 6 Drawing Sheets

(56) References Cited

U.S. PATENT DOCUMENTS

| | | | |
|---|---|---|---|
| 2016/0117258 A1 | 4/2016 | Karamcheti et al. | |
| 2016/0196223 A1* | 7/2016 | Lee | G06F 3/0613 |
| | | | 710/308 |
| 2016/0292095 A1* | 10/2016 | Hinkle | G06F 3/0635 |
| 2016/0378623 A1* | 12/2016 | Kumar | G06F 3/0647 |
| | | | 714/3 |
| 2017/0052780 A1* | 2/2017 | Clevenger | G06F 8/76 |
| 2017/0277640 A1* | 9/2017 | Jin | G06F 12/1054 |
| 2017/0351626 A1* | 12/2017 | Lalam | G06F 13/4027 |
| 2018/0024768 A1* | 1/2018 | Nguyen | G06F 3/0647 |
| | | | 711/103 |
| 2019/0042415 A1* | 2/2019 | Boyd | G06F 12/0897 |
| 2019/0179750 A1* | 6/2019 | Moyer | G06F 11/2069 |
| 2020/0042184 A1* | 2/2020 | Zhao | G06F 3/067 |
| 2020/0097192 A1* | 3/2020 | de Kort | H04L 63/101 |
| 2020/0233586 A1* | 7/2020 | Ravishankar | G06F 3/0659 |

OTHER PUBLICATIONS

Zhang, Xinwen, et al. "Secure Bus: towards application-transparent trusted computing with mandatory access control." Proceedings of the 2nd ACM symposium on Information, computer and communications security. 2007. (Year: 2007).*

Vijaya, Aparna, and V. Neelanarayanan. "Framework for platform agnostic enterprise application development supporting multiple clouds." Procedia Computer Science 50 (2015): 73-80. (Year: 2015).*

* cited by examiner

BLOCK INPUT/OUTPUT (I/O) ACCESSES IN THE PRESENCE OF A STORAGE CLASS MEMORY

BACKGROUND

The present invention relates to computer memory, and more specifically, to accessing storage class memory (SCM) in legacy applications.

SCM is a hybrid storage/memory tier with unique characteristics. It's not exactly memory, and it's not exactly storage. Physically, it connects to memory slots in a motherboard, like traditional DRAM. While SCM is slightly slower than DRAM, it is persistent, meaning that, like traditional storage, its content is preserved during a power cycle. In legacy computing systems, the flash memory is attached behind industry standard storage controller technologies, like traditional hard disks. Data from the flash device must first be brought into a primary host memory, such as a dynamic random access memory (DRAM), before central processing units (CPUs) can perform computations and modifications. For this transfer to occur, an application must issue a read system call to a file system so that eventually a controller can peripheral component interconnect express (PCIe) direct memory access (DMA) the data into the host memory.

While newer applications can use newly created libraries to read and write the SCM directly from the application layer, legacy applications can conventionally only use SCM as secondary block input/output (I/O) storage. This limitation exists because the legacy applications are not aware of the new usage models and application programming interfaces (APIs) to access SCM. As a consequence, the advantages of using storage class memory (SCM) in legacy computing environments can be undermined by undesirable levels of processing and latency.

SUMMARY

According to one embodiment of the present invention, a method of managing memory includes collocating persistent electronic memory (e.g., like flash memory) along with a primary memory on the same memory module. The persistent electronic memory and the primary memory communicate via a module local bus comprising a plurality of memory channels. A data migration protocol may be used over a memory channel of the plurality of memory channels to copy data from the electronic persistent memory to the primary memory, and the data may be accessed from the primary memory.

According to another particular embodiment, an apparatus includes a memory module comprising a primary memory and a host memory bus. An electronic persistent memory may be positioned on the memory module and be configured to communicate with the primary memory using a memory channel of a plurality of memory channels of the module local bus. A controller may be configured to use a data migration protocol over the memory channel to copy data from the electronic persistent memory to the primary memory and to access the data from the primary memory.

According to another particular embodiment, a computer program product to manage memory may include a computer-readable storage medium having computer-readable program code embodied therewith, the computer-readable program code executable by one or more computer processors to: initiate copying data from a electronic persistent memory to a primary memory using a data migration protocol over a memory channel of a plurality of memory channels associated with a host memory bus. The electronic persistent memory and the primary memory may be collocated and connected via the host memory bus, and the data from the primary memory may be automatically accessed.

DETAILED DESCRIPTION

An embodiment of a system enables legacy applications to benefit from storage class memory (SCM) through the use of an operating system layer and hardware controller, but without modifications to legacy applications, themselves. Block input/output (I/O) accesses for the legacy computing systems, or traditional applications, may be transparently accelerated in the presence of a storage class memory. An implementation may provide fairness as between block accesses to SCM and byte addressable accesses to dynamic random access memory (DRAM). The system may include a data migration protocol over memory channel to migrate data to and from collocated electronic persistent memory (like flash memory) and DRAM.

A legacy system may include a method, technology, or application program, of, relating to, or being a previous or outdated computer system yet still in use. Storage class memory, also known as persistent memory, while slower than DRAM, may retain data in the absence of power. That is, the content of storage class memory may be preserved during a power cycle.

The system may migrate data to and from a collocated DRAM and persistent electronic memory using a data migration protocol over a memory channel. The system may leverage storage class memory to accelerate block I/O access for legacy applications. Block I/O storage and access may involve mapping data to specific blocks from a specific device managed by a specific device driver.

Embodiments of the system enable SCM devices as an alternate to magnetic disks. The SCM devices may provide better access latency. SCM devices are significantly faster than magnetic disks in access latency. Inclusion of technologies such as non-volatile memory express (NVMe) may further boost usage in secondary memory space due to improvements in bandwidth and latency. An embodiment of storage class memory may include non-volatile dual in-line memory module (NVDIMM) to provide very low access latency.

An embodiment of the system allows legacy applications to be unaware of new usage models and APIs. An embodiment of the system thus enables legacy applications to benefit from storage class memory with modifications in the operating system layer and hardware controller, but without modifications to the legacy application. That is, while legacy applications may be unaware of new libraries and APIs to access SCM, an embodiment of the system may nonetheless enable the legacy applications to benefit from SCM without a change in the application.

System software (e.g., a device driver and a file system) written to access traditional, secondary memory may be based on a block addressing method so as to seamlessly fit SCM devices into the same space. SCM devices are also made block addressable.

The data may then be copied back for secondary storage and persistence. These processes may involve the secondary storage controller to direct memory access (DMA) data into primary memory and back. While SCM memory and modern non-volatile memory express (NVMe) devices have low access latency on an I/O bus, SCM devices attached to a primary memory bus have significantly lower access latency. More particularly, modern storage class memory, such as non-volatile dual in-line memory module (NVDIMM) and related devices, may be present in a host memory bus along side DRAMs and provide very low access latency.

An embodiment of a method may advantageously use a DRAM portion of the SCM module for application data storage, while simultaneously using the electronic persistent memory portion as secondary storage. The net advantage may include a capacity increase in memory available to the application.

An embodiment of the system may include a dual in-line memory module that houses dynamic random-access memory. The DIMM may also include an electronic persistent memory on the same device.

As configured, a legacy application may issue a block IO commands to the electronic persistent memory portion of the SCM. As a result, low level system software may issue a data migration command to a media controller to copy a block of data from an electronic persistent memory device into the DRAM portion at an address provided by the system software. The system may not require the legacy application to be aware of configuration and may transparently benefit latency and throughput.

According to one particular hardware design feature, an embodiment of an NVDIMM controller may include the ability to take a command to initiate the data copy operation between the electronic persistent memory and the DRAM device on the same DIMM module. The command may have parameters that include: an address of the DRAM to read-from or write-to, a block number (e.g., a four kilobyte block sector), a block offset in memory sector, and an operation size. This hardware design is one implementation of SCM.

The NVDIMM controller may initiate a line-by-line copy operation of block content to designate a DRAM location. In order to provide compatibility to the software, the NVDIMM controller may read or write a full block from the electronic persistent memory by moving only relevant sections of data to the DRAM. Such an action may be similar to buffered block read/write system call.

In the alternative, an embodiment of the device may enforce only a block size copy (e.g., 4096 bytes) and mandate use of direct I/O APIs only on the block device. This configuration and controller design may simplify some processes because all read/write requests may be 4K size-aligned, and the DRAM addresses may also become 4K aligned. Different page sizes may also be supported. Buffering within the device may be avoided.

According to another particular hardware design feature, the NVDIMM controller may facilitate system software to implement wear leveling on a block of electronic persistent memory. Wear leveling is a technique for prolonging the service life of some kinds of erasable computer storage media, which is used in solid-state drives (SSDs) and USB flash drives, and phase-change memory. The NVDIMM controller may run a firmware layer where a memory block is translated in a manner similar to an SSD or NVMe device. In an alternative implementation, wear leveling and reliability tasks of a memory block are offloaded to system software. The system of an embodiment may capture and indicate block erase counts, while system software vacates high hit rate blocks and uses other known techniques to move data around.

According another particular hardware design feature, DRAM size may match the electronic persistent memory size since the device is intended to be used as NVDIMM. In another implementation, DRAM size may be less than the size of the electronic persistent memory and may use a block layer API translation. In a case where there are partial failures in either the DRAM or the electronic persistent memory capacity, the block I/O method may still be functional. This functionality may be attributable to the DRAM and blocks not needing to match in capacity.

According to another particular hardware design feature, the NVDIMM controller may interleave data copy operation across multiple requests. The interleaving may provide fairness and uniform response time. The granularity of the interleaving may be adjusted according to a requested operation.

A particular embodiment may be implemented in a system having an NVDIMM-type architecture. System software may send a command over to an NVDIMM controller to transfer a block of data from electronic persistent memory to the DRAM or vice versa. A supercapacitor may optionally be used on-board to store energy. With use of a supercapacitor, the data copied from the electronic persistent memory to the DRAM may be persistent because the supercapacitor may copy dirty data back to the electronic persistent memory. Without the supercapacitor, an implementation may be similar to an electronic persistent memory as secondary storage (block I/O device).

Multiple devices may be mapped and interleaved in system software so as to further improve throughput. For example, DRAM page allocations may be interleaved across two or more devices and further matched with memory block interleaving as well. If one megabyte of data is requested, the data may be split across multiple devices and each of them may in parallel perform the copy operation within their device. System software may keep track of data location and allocate DRAM buffers to match the interleaving and locality of data so as to minimize data copy outside of the device. Because no memory bus bandwidth is used to move the data, operating on multiple devices (e.g., multiple NAND memory devices) may scale I/O operations advantageously.

In a case where the DRAM buffer is not collocated with the electronic persistent memory block, a CPU-based memcopy function or chip-level DMA process may move data from a memory block of one device to a DRAM of another device. This configuration may serve as a fallback mechanism to provide software compatibility and sustained operation even in a suboptimal memory allocation situation.

Block I/O accesses for the legacy computing systems may be transparently accelerated in the presence of a storage class memory. An implementation may provide fairness among block accesses to flash versus byte addressable accesses to DRAM. The system may include a data migration protocol over memory channel to migrate data to and from collocated electronic persistent memory and DRAM.

A conventional method of an application accessing memory data on an I/O adapter (e.g., SSD) may involve the application issuing a read API to a file system. An adapter may DMA data into a host memory. The application may then access the data from the primary memory. The data may eventually be written back to the flash memory on the I/O adapter.

An embodiment of a system may use an electronic persistent memory device on a DIMM such that the electronic persistent memory device is collocated with DRAM. An application may issue a read API to the file system. An operating system may recognize that the electronic persistent memory device is collocated on the DIMM, along with the DRAM. The operating system may allocate memory space on the DRAM. The operating system may further program a controller to copy data from the electronic persistent memory to the DRAM. The application may access the data from the primary memory. Data may eventually be written back to the electronic persistent memory from DRAM.

An embodiment of the system promotes fairness by interleaving to improve bandwidth. An NVDIMM controller may make a command to initiate the data copy operation between electronic persistent memory and DRAM device on the same DIMM module. The command may have parameters that include an address of DRAM from which to read-from or write-to, a memory block number (e.g., a four kilobyte block sector), a block offset in sector, and an operation size.

Figure 1:
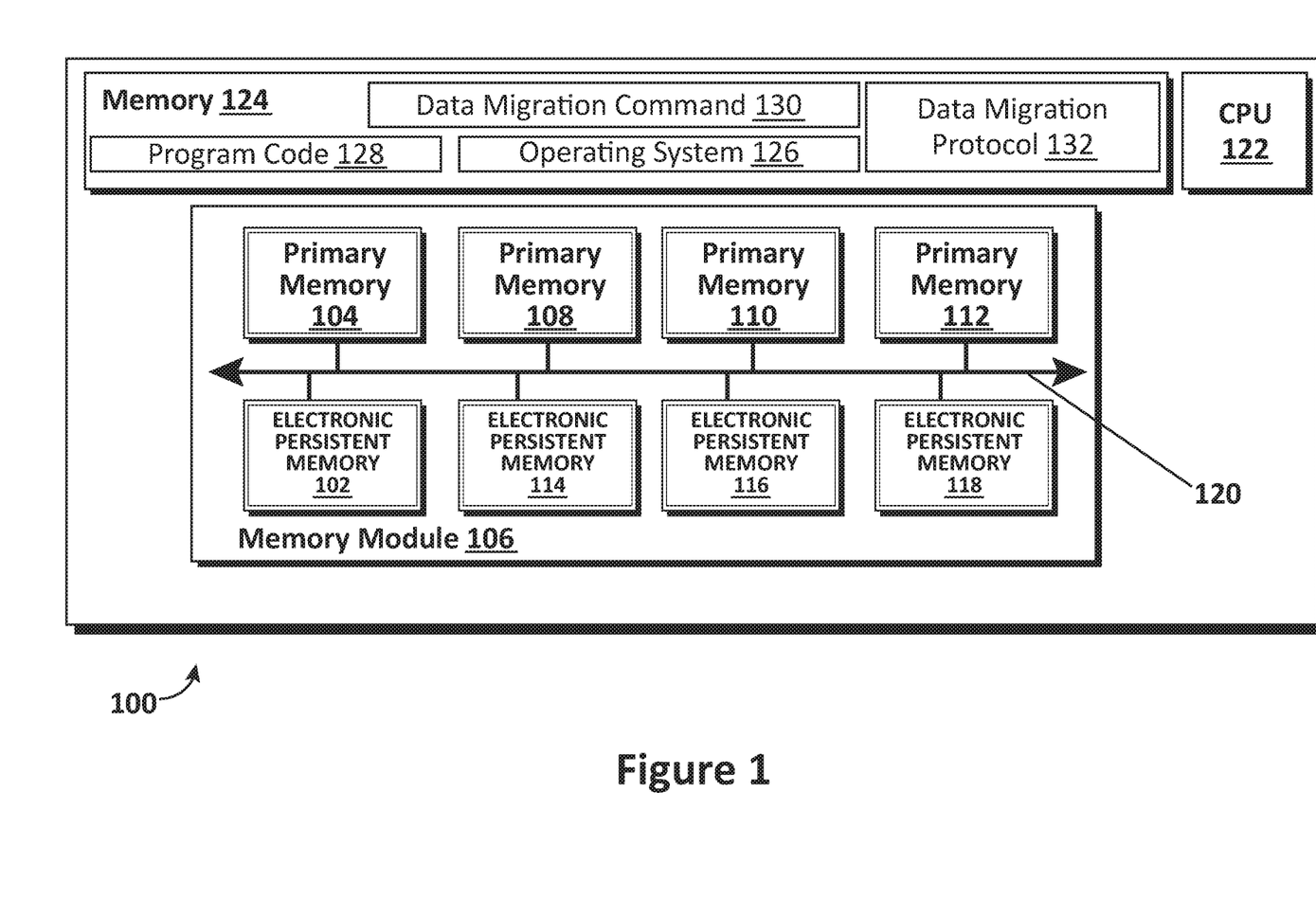
FIG. 1 is high level block diagram of an embodiment of a computing system that includes electronic persistent memory that is collocated with primary memory on a memory module to transparently accelerate I/O accesses.

With reference now to the Drawings, FIG. 1 is high level block diagram of an embodiment of a computing system 100 that includes electronic persistent memory 102 that is collocated with primary memory 104 on a memory module 106 to transparently accelerate I/O accesses to electronic persistent memory. In a particular example, the electronic persistent memory 102 may include flash memory and the primary memory 104 may include a DRAM. The memory module 106 may be a DIMM or NVDIMM, and the computing system 100 may be computing system.

Additional primary memory 108, 110, 112 may be present on memory module 106, as is additional electronic persistent memory 114, 116, 118. The electronic persistent memory 102, 114, 116, 118 may represent a departure from some legacy computing systems that use magnetic disk memory. The primary memory 104, 108, 110, 112 and the electronic persistent memory 102, 114, 116, 118 may be connected via a module local bus 120.

The computing system 100 may include a CPU 122 and a memory 124. The memory 124 may include an operating system 126 and program code 128 to be executed by the CPU 122. Additional program code depicted in the memory 124 may include a data migration command 130, as well as a data migration protocol 132 to run on one or more of the memory channels supported on the module local bus 120.

The operating system 126 may be configured to automatically recognize that the electronic persistent memory 102 is collocated on the memory module 106, along with the primary memory 104. The operating system 126 may further be configured to allocate memory space within the primary memory 104, as well as to initiate data migration between the primary memory 104, 108, 110, 112 and the electronic persistent memory 102, 114, 116, 118. The system 100 may not require the legacy applications to be aware of collocated electronic persistent memory 102, 114, 116, 118 and primary memory 104, 108, 110, 112 and may transparently benefit latency and throughput.

Figure 2:
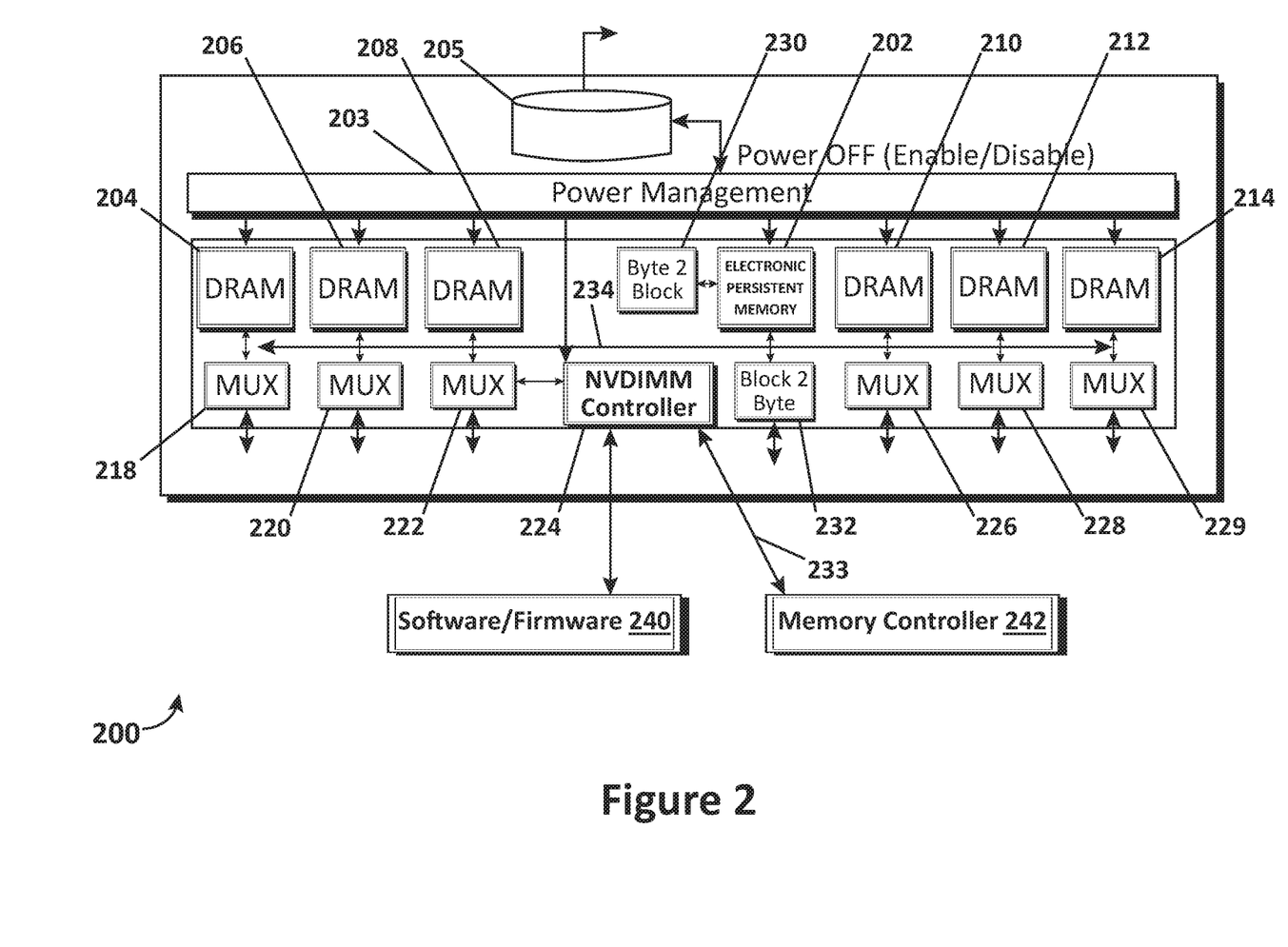
FIG. 2 is a diagram of a particular embodiment of an NVDIMM-type architecture system that includes collocated NAND memory to provide low access latency.

FIG. 2 is a diagram of a particular embodiment of an NVDIMM-type architecture system 200 that includes collocated primary memory 202, 204, 206, 208, 210, 212, 214 and NAND flash memory 202 and an NVDIMM controller 224 to provide low access latency. The NVDIMM controller 224 may be coupled to the memory controller 242 via a host memory bus 233. As shown in the figure, the system 200 also include multiplexers 218, 220, 222, 224, 226, 228, 229 and memory blocks 230, 232 coupled to a module local bus 234.

The combined memory capacities of a primary memory modules (e.g. DRAM) 204, 206, 208, 210, 212, 214 may match that of the electronic persistent memory 202 since the device functions as an NVDIMM. In another implementation, the primary memory (e.g. DRAM) size may be less than the size of the electronic persistent memory 202 and may use a block layer API translation.

The NVDIMM controller 224 may receive and execute a command to transfer a block of data from electronic persistent memory 202 to the DRAM 204, or from the DRAM 204 to the electronic persistent memory 202. The command (e.g., a data migration command) may be received from system software/firmware 240 or a memory controller 242, for instance. The command may specify an address for the memory operation as well as one or more of a block number (e.g., a four kilobyte block sector), a block offset in sector, and an operation size.

The NVDIMM controller 224 may initiate a line-by-line copy operation of electronic persistent memory block content to a designated a DRAM location. In order to provide compatibility to the software, the NVDIMM controller 224 may read or write a full block from the electronic persistent memory by moving only relevant sections of data to the DRAM 204. Alternatively, the NVDIMM controller 224 may enforce only a block size copy (e.g., four kilobyte) and mandate use of direct I/O APIs only on the electronic persistent memory 202. In either case, buffering within the electronic persistent memory 202 may be avoided.

According to another particular hardware design feature, the NVDIMM controller 224 may facilitate system software to implement wear leveling on a block of electronic persistent memory 202. According another particular hardware design feature, the NVDIMM controller 224 may interleave data copy operation across multiple requests. The interleaving may provide fairness and uniform response time. The granularity of the interleaving may be adjusted according to a requested operation, and may occur across multiple devices. The system software 240 of an embodiment may provide location tracking and buffering to facilitate the interleaving.

The system 200 of FIG. 2 further includes a power management module 203 and a supercapacitor 205. The supercapacitor 205 may optionally be used on-board to store energy. With use of the supercapacitor 205, the data copied from the electronic persistent memory 202 to the DRAM 204 may be persistent because the supercapacitor 205 may copy dirty data back to the electronic persistent memory 202 in the event of power loss.

Figure 3:
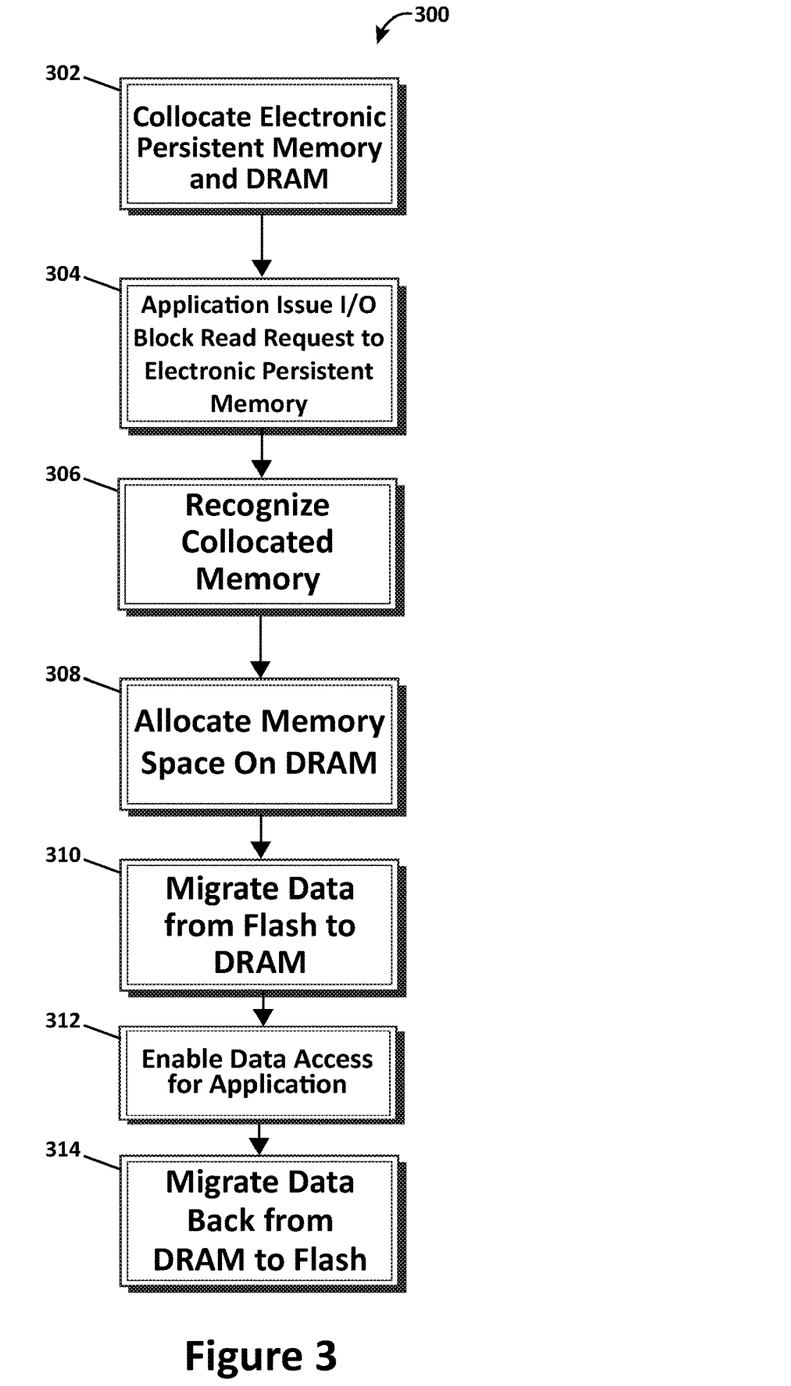
FIG. 3 is a flowchart showing processes associated with an embodiment of a method of managing memory.

FIG. 3 is a flowchart showing processes associated with an embodiment of a method 300 of managing memory. Processes may transparently accelerate block I/O accesses for the legacy applications in the presence of a storage class memory. An implementation may provide fairness among block accesses to electronic persistent memory as part of SCM versus byte addressable accesses to DRAM. The system may include a data migration protocol over memory channel to migrate data to and from collocated electronic persistent memory and DRAM.

Turning more particularly to the flowchart, an electronic persistent memory at 302 may be positioned on a memory module (e.g. DIMM) such that the electronic persistent memory is collocated with primary memory (e.g. DRAM). The electronic persistent memory may be coupled to the DRAM (or other primary memory) using a module local bus. An application may issue a read request to the file system at 304.

An operating system at 306 may recognize that the electronic persistent memory device is collocated on the memory module (e.g. DIMM), along with the primary memory (e.g. DRAM). The operating system at 308 may allocate memory space on the DRAM.

At 310, the operating system may further program a controller to copy data from the electronic persistent memory to the DRAM. The application may access the data at 312 from the primary memory. Data (modified or unmodified) may eventually be written back to the electronic persistent memory from DRAM at 314 in a manner similar to that explained above.

Figure 4:
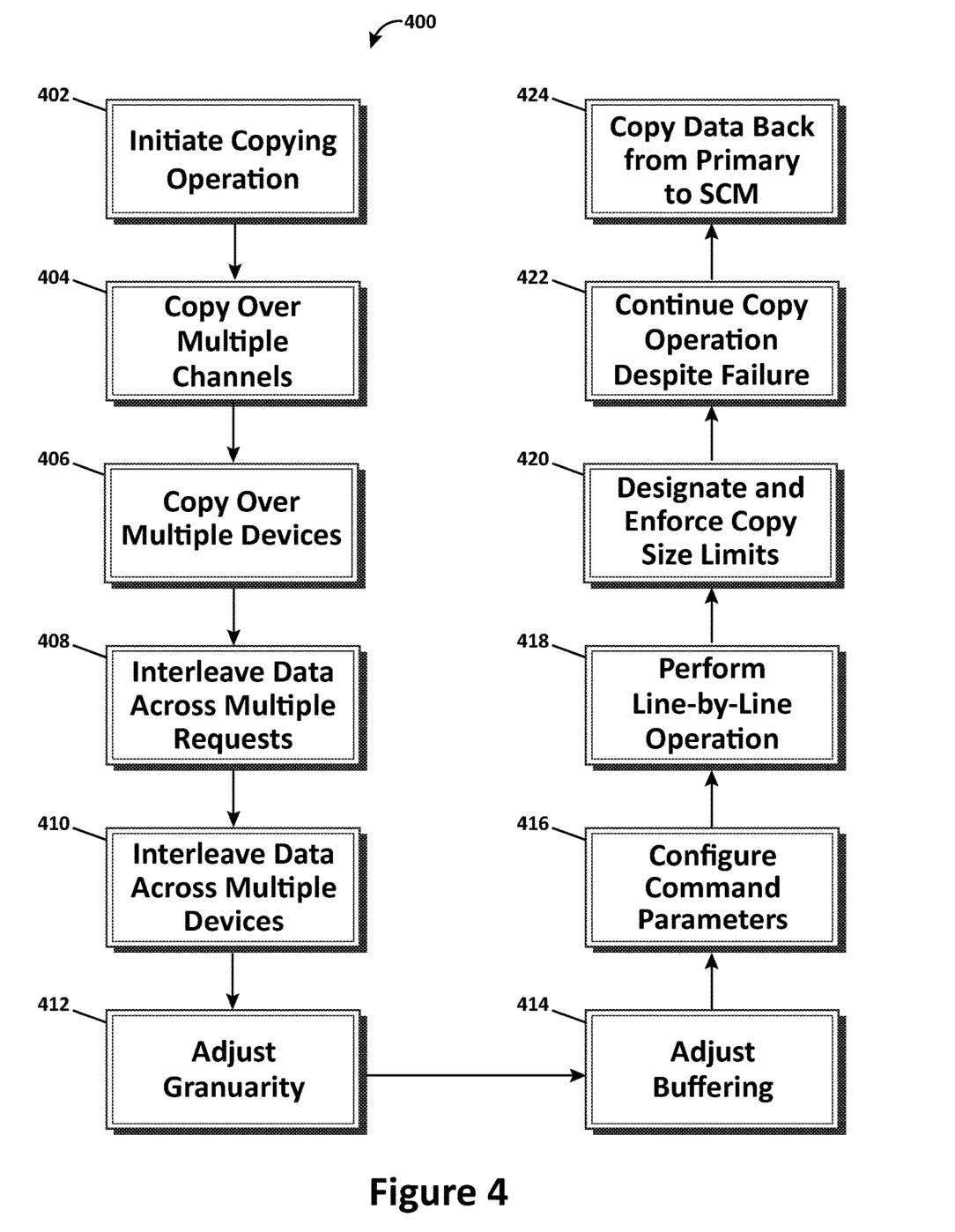
FIG. 4 is a flowchart illustrating processes of a method of migrating data between a collocated electronic persistent memory and a primary memory, such as those relating to data copying shown in the method of FIG. 3.

FIG. 4 is a flowchart illustrating processes of a method 400 of migrating data between a collocated electronic persistent memory and a primary memory. The method 400 may relate to processes associated with data copying in the method 300 of FIG. 3. At 402, an operating system may program a controller to initiate copying data from the electronic persistent memory to the DRAM. In another or the same embodiment, data may alternatively be copied from DRAM over to the electronic persistent memory. Where desired at 404 and 406, respectively, the copying may be configured to copy the data over multiple memory channels and multiple memory devices in parallel.

Data may be interleaved at 408 across the plurality of requests. Similarly, the data may be interleaved at 410 across the plurality of memory devices, such as electronic persistent memory and DRAM devices. The granularity and buffering may be adjusted at 412 and 414, respectively, to facilitate interleaving according a given memory operation.

A command to copy the data may be configured at 416 with parameters that include at least one of: an address of the DRAM to read-from or write-to, an electronic persistent memory block number, a block offset in electronic persistent memory sector, and an operation size. The copying at 418 may include performing a line-by-line copy operation, as discussed herein. Copy block size limitations may be designated and enforced at 420.

An embodiment may successfully continue a copy operation at 422. In a case where there are partial failures in either the DRAM or the electronic persistent memory capacity, the block I/O method may still be functional. This functionality may be attributable to the DRAM and blocks not needing to match in capacity.

At 424, data may be written from the primary memory to flash memory. In this manner, embodiments of the system implement fairness concepts, such as interleaving to improve bandwidth. For instance, an NVDIMM controller may make a command to initiate the data copy operation between electronic persistent memory and DRAM device on the same DIMM module. The command may have parameters that include an address of DRAM from which to read-from or write-to, a memory block number (e.g., a four kilobyte block sector), a block offset in memory sector, and an operation size.

Figure 5:
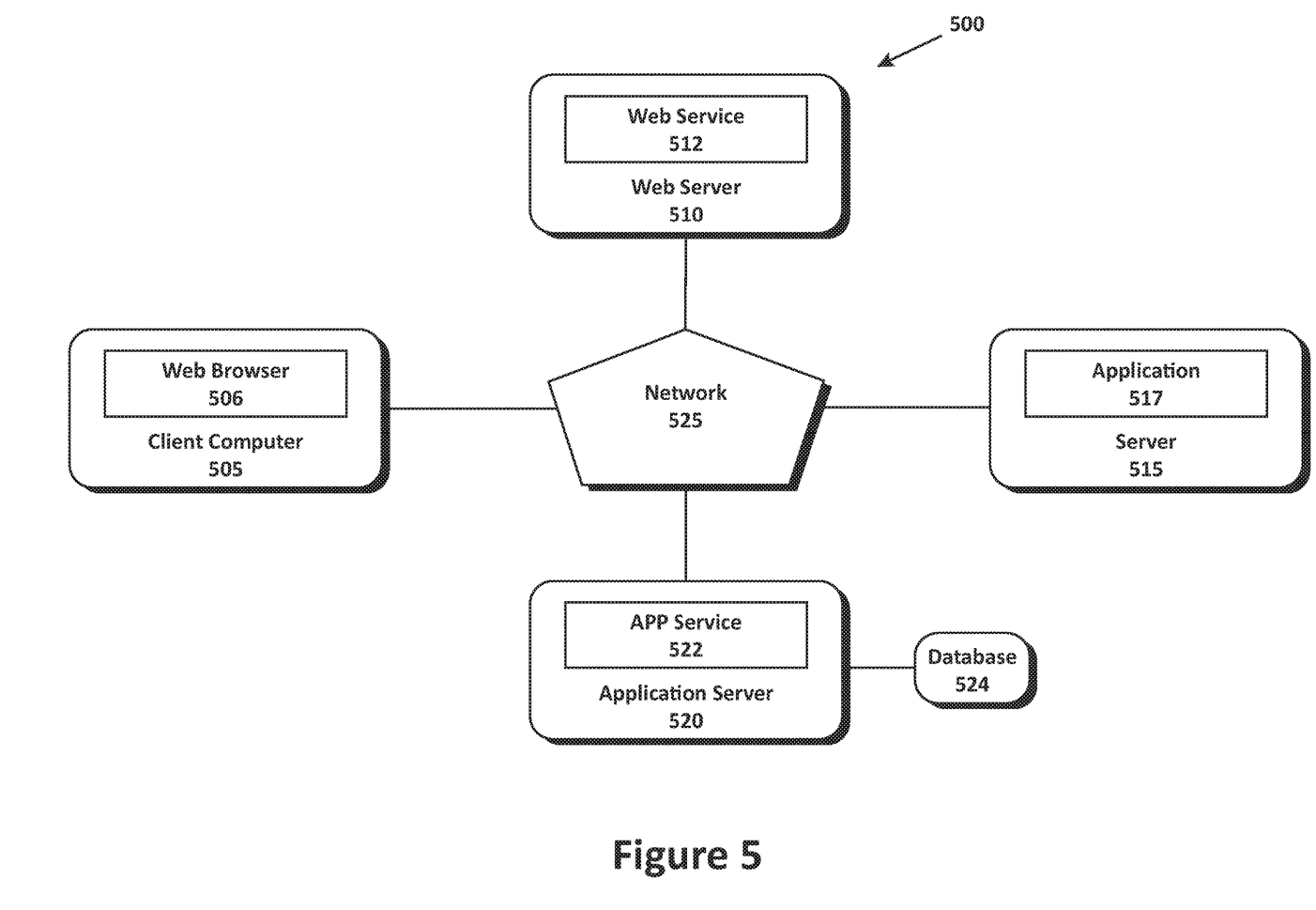
FIG. 5 illustrates an example computing system, according to one embodiment described herein.

FIG. 5 illustrates an example computing system, according to one embodiment described herein. As shown, the computing environment 500 includes a client computer 505, a web server 510, a server 515, and an application server 520. The client computer 505 may be a physical system (e.g., a POS system, a desktop computer, laptop computer, mobile device, etc.) or a virtual computing instance executing in the cloud. The client computer 505 includes a web browser 506. A user may access data services through the web browser 507 over a network 525 (e.g., the Internet).

For instance, a user may access a web service 512 executing on a web server 510 (e.g., a manufacturer website including driver software for a POS device). In one embodiment, the web service 512 provides a web interface for an application server 520 (e.g., executing an application service 522). More specifically, the application service 522 provides a database 524. The database 524 may include data presented to users on the web browser 507.

Figure 6:
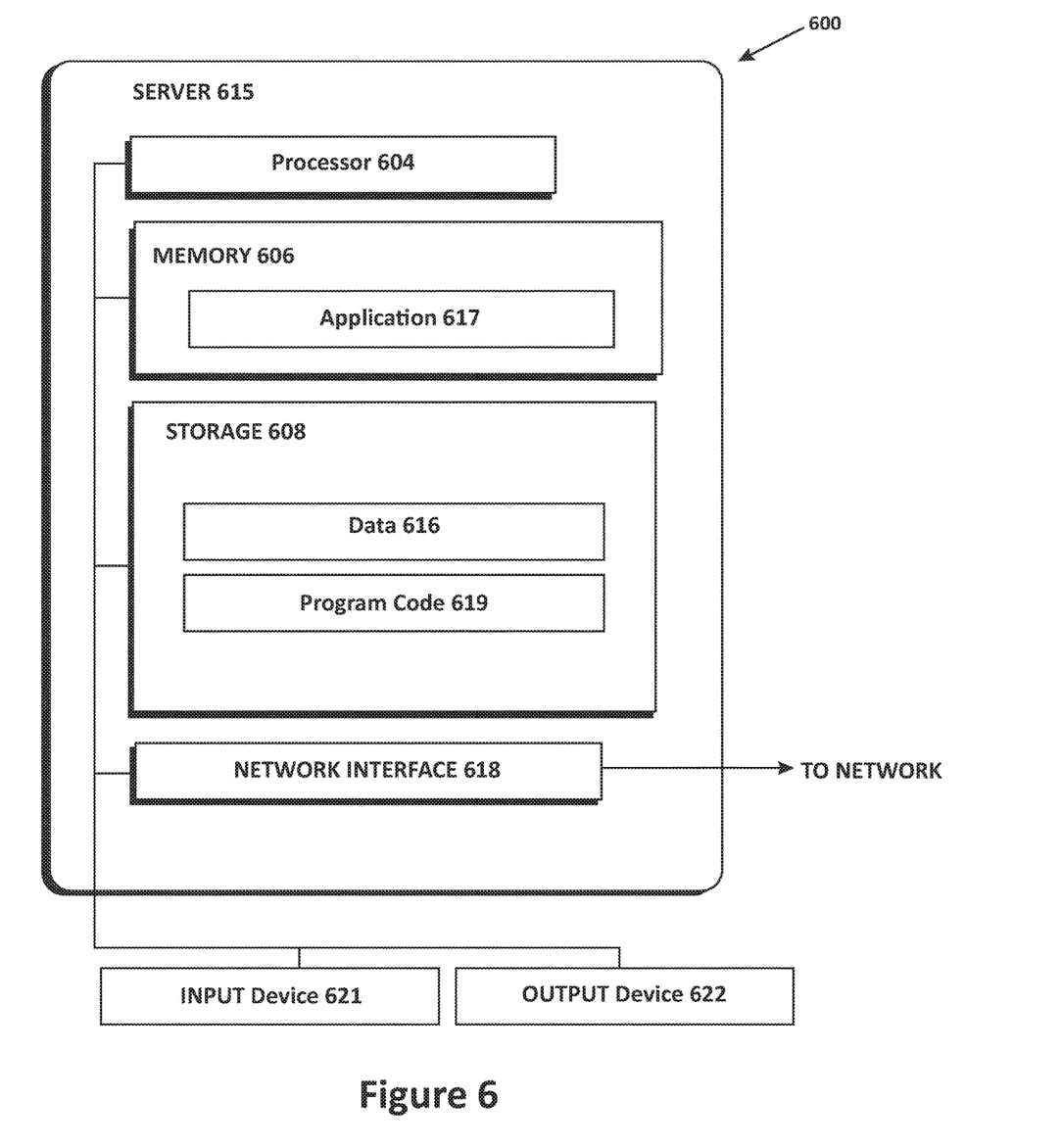
FIG. 6 further illustrates an example computing system, according to one embodiment described herein.

FIG. 6 further illustrates an example computing system 615, according to one embodiment described herein. The server 615 generally includes a processor 604 connected via a bus to a memory 606, a network interface device 618, a storage 608, an input device 621, and an output device 624. The server 615 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 610 to communicate with other computers via the network 625, including a wired or wireless network interface.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems. Further, the storage 608 may include a suitable electronic database.

As shown, the memory 606 contains the application 617, which may be an application generally executed to take actions described herein (e.g., as discussed above with regard to FIGS. 1-5. Storage 608 contains data 616 and program code 619.

The input device 621 may provide a keyboard and a mouse, etc. The output device 622 may be any conventional display screen. Although shown separately from the input device 621, the output device 624 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present invention, other and further embodiments of the invention may be devised without departing from the basic scope thereof, and the scope thereof is determined by the claims that follow.

What is claimed is:

1. A method of managing memory, the method comprising:
receiving, from a software application executing on an operating system, a request to access data, wherein the data is stored in an electronic persistent memory collocated with a primary memory on a memory module, and wherein the software application is unaware that the electronic persistent memory is collocated with the primary memory on the memory module;

detecting, by the operating system, that the electronic persistent memory is collocated with the primary memory on the memory module, wherein the electronic persistent memory and the primary memory communicate via a module local bus comprising a plurality of memory channels; and in response to detecting that the electronic persistent memory is collocated with the primary memory on the memory module and in response to the request, using a data migration protocol over a memory channel of the plurality of memory channels to copy the data from the electronic persistent memory to the primary memory such that the data is accessible to the software application from the primary memory.

2. The method of claim 1, further comprising allocating memory space within the primary memory in response to receiving a read data command.

3. The method of claim 1, further comprising copying the data over multiple memory channels of the plurality of memory channels in parallel.

4. The method of claim 1, further comprising writing back the data to the electronic persistent memory from the primary memory via the module local bus.

5. The method of claim 1, further comprising issuing a command having parameters that include at least one of: an address of the primary memory to read-from or write-to, a block number, a block offset in memory sector, and an operation size.

6. The method of claim 1, wherein copying the data from the electronic persistent memory to the primary memory comprises a line-by-line copy operation of content of the electronic persistent memory to designated a location of the primary memory.

7. The method of claim 1, wherein copying the data from the electronic persistent memory to the primary memory comprises enforcing a copy block size limitation.

8. The method of claim 1, further comprising using firmware on the memory module to initiate a wear leveling operation on the electronic persistent memory.

9. The method of claim 1, wherein copying the data from the electronic persistent memory to the primary memory succeeds while there is a partial error in one or both of the electronic persistent memory and the primary memory.

10. The method of claim 1, wherein copying the data from the electronic persistent memory to the primary memory includes interleaving the data across a plurality of requests.

11. The method of claim 10, further comprising adjusting a granularity of the interleaving according to a requested operation.

12. The method of claim 10, further comprising using a buffer associated with the primary memory to facilitate the interleaving.

13. The method of claim 1, wherein copying the data from the electronic persistent memory to the primary memory includes interleaving the data across a plurality of memory devices.

14. An apparatus comprising:
a memory module comprising a primary memory and a host memory bus;
an electronic persistent memory positioned on the memory module and configured to communicate with the primary memory using a memory channel of a plurality of memory channels of the module local bus; and a controller configured to:
    receive, from a software application executing on an operating system, a request to access data stored in the electronic persistent memory, wherein the software application is unaware that the electronic persistent memory is positioned on the memory module with the primary memory;
    detect, by the operating system, that the electronic persistent memory is positioned on the memory module with the primary memory; and
    in response to detecting that the electronic persistent memory is positioned on the memory module with the primary memory and in response to the request, use a data migration protocol over the memory channel to copy the data from the electronic persistent memory to the primary memory such that the data is accessible to the software application from the primary memory.

15. The apparatus of claim 14, further comprising a supercapacitor positioned on the memory module.

16. The apparatus of claim 14, wherein a memory capacity of the electronic persistent memory is larger than a memory capacity of the primary memory.

17. The apparatus of claim 14, wherein a memory capacity of the electronic persistent memory is about the same size as a memory capacity of the primary memory.

18. A computer program product to manage memory, the computer program product comprising a non-transitory computer-readable storage medium having computer-readable program code embodied therewith, the computer-readable program code executable by one or more computer processors to:
    receive, from a software application executing on an operating system, a request to access data, wherein the data is stored in an electronic persistent memory collocated with a primary memory on a memory module, and wherein the software application is unaware that the electronic persistent memory is collocated with the primary memory on the memory module;
    detect, by the operating system, that the electronic persistent memory is collocated with the primary memory on the memory module, wherein the electronic persistent memory and the primary memory communicate via a module local bus comprising a plurality of memory channels; and
    in response to detecting that the electronic persistent memory is collocated with the primary memory on the memory module and in response to the request, initiate copying the data from the electronic persistent memory to the primary memory using a data migration protocol over a memory channel of the plurality of memory channels such that the data is accessible to the software application from the primary memory.

* * * * *